United States Patent
Fukushima et al.

(10) Patent No.: US 9,948,883 B2
(45) Date of Patent: Apr. 17, 2018

(54) INFORMATION PROCESSING APPARATUS AND INFORMATION PROCESSING METHOD THAT NOTIFY WHEN A DISPLAY UNIT IS DETERMINED TO BE ABLE TO DISPLAY AN IMAGE BASED ON A DISPLAY IMAGE WITH BRIGHTNESS OF INPUT IMAGE DATA

(71) Applicant: CANON KABUSHIKI KAISHA, Tokyo (JP)

(72) Inventors: Takehito Fukushima, Fuchu (JP); Ikuo Takanashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/453,924

(22) Filed: Mar. 9, 2017

(65) Prior Publication Data

US 2017/0272686 A1 Sep. 21, 2017

(30) Foreign Application Priority Data

Mar. 17, 2016 (JP) .................................. 2016-053856

(51) Int. Cl.
*H04N 5/57* (2006.01)
*H04N 5/445* (2011.01)

(52) U.S. Cl.
CPC ........... *H04N 5/57* (2013.01); *H04N 5/44504* (2013.01)

(58) Field of Classification Search
CPC .............................. H04N 5/57; H04N 5/44504
USPC ....................................................... 348/687
See application file for complete search history.

(56) References Cited

U.S. PATENT DOCUMENTS

| 2012/0148090 | A1* | 6/2012 | Omi | G06T 5/009 382/100 |
| 2013/0114000 | A1* | 5/2013 | Atkins | H04N 5/20 348/708 |
| 2014/0375675 | A1* | 12/2014 | Ishihara | G09G 5/003 345/601 |
| 2015/0256846 | A1 | 9/2015 | Hattori et al. | |
| 2016/0210891 | A1* | 7/2016 | Zhang | G09G 5/02 |

FOREIGN PATENT DOCUMENTS

JP    2015-170904 A    9/2015

* cited by examiner

*Primary Examiner* — Michael Lee
(74) *Attorney, Agent, or Firm* — Fitzpatrick, Cella, Harper & Scinto

(57) ABSTRACT

An information processing apparatus acquires input brightness information of input image data. A setting unit sets, based on a user's operation, a display range for displaying within a range of brightness possibly taken by the input image data, and reference brightness that is an upper limit of brightness of a display unit. A generation unit generates display image data by converting gradation characteristics of the input image data based on the display. The brightness of the display unit is controlled based on the reference brightness. A notification unit performs first notification processing when the display unit is able to display an image based on the display image data with brightness of the input image data, and second notification processing when the display unit is not able to so display the image, based on the display range, the reference brightness, and the input brightness information.

51 Claims, 5 Drawing Sheets

MAXIMUM BRIGHTNESS OF FRAME OR THE LIKE

| REFERENCE BRIGHTNESS [cd/m$^2$] | MAXIMUM BRIGHTNESS OF DISPLAY RANGE [cd/m$^2$] | BRIGHTNESS OF INPUT IMAGE DATA [cd/m$^2$] | DISPLAYABLE INFORMATION |
|---|---|---|---|
| 48~400 | 100~1000 | 100~1000 | GREEN OR RED |
| 400 | 400 | 100 | GREEN |
| | | 400 | GREEN |
| | | 1000 | RED |
| | 1000 | 100 | RED |
| | | 400 | RED |
| | | 1000 | RED |

INFORMATION PROCESSING APPARATUS AND INFORMATION PROCESSING METHOD THAT NOTIFY WHEN A DISPLAY UNIT IS DETERMINED TO BE ABLE TO DISPLAY AN IMAGE BASED ON A DISPLAY IMAGE WITH BRIGHTNESS OF INPUT IMAGE DATA

CLAIM OF PRIORITY

This application claims the benefit of Japanese Patent Application No. 2016-053856, filed on Mar. 17, 2016, which is hereby incorporated by reference herein in its entirety.

BACKGROUND OF THE INVENTION

Field of the Invention

The present invention relates to an information processing apparatus and an information processing method.

Description of the Related Art

In recent years, captured image data having a wider dynamic range than BT.709 used as the general standard of image data has been generated with an improvement in the light-receiving performance of imaging apparatuses. Hereafter, image data having a wide dynamic range will be described as "high dynamic range (HDR) image data." For example, a Cineon log set based on the characteristics of a film having a wide dynamic range has been used as the data format of the HDR image data. In an image production workflow, the HDR image data representing captured image data is displayed on a display apparatus at the time of capturing an image, and the confirmation of a signal level and the adjustment of color of an imaging apparatus are performed based on a display result.

On the other hand, in the display apparatus, there is a case that a displayable dynamic range (display range) is restricted to a dynamic range (image capturing range) narrower than the dynamic range of the imaging apparatus due to a concern of an increase in power consumption, a reduction in reliability due to the heat generation of components, or the like. Further, image data, of which the dynamic range is wider than a display range, is displayed after being subjected to image processing (compression processing) to reduce the dynamic range to the display range. In a case when the image data is subjected to the compression processing, the brightness of an entire display image (image displayed on a screen) reduces, and the visibility of the display image reduces.

Therefore, as a function of the display apparatus, there has been proposed the function of setting a display range specified by a user and adjusting the dynamic range of image data to the set display range. A grading operator performs a grading operation to confirm a display image while changing a display range for each of a plurality of images (a plurality of static-image data or a plurality of frames of moving-image data). The grading operator generally grasps the characteristics of the imaging apparatus and the characteristics of the display apparatus. Further, it is possible for the grading operator to perform the grading operation while grasping whether the brightness of a display image is correct. Specifically, it is possible for the grading operator to perform the grading operation while grasping whether the brightness of a display image coincides with the brightness of captured image data (brightness of an object).

However, the HDR image data has become widespread in household display apparatuses (for example, household television apparatuses) as well. Further, it is assumed that in each of the household display apparatuses, a display range is not set for each image, but a plurality of images is displayed using the same display range. Therefore, the brightness of a display image may be incorrect. Generally, a user of the household display apparatus does not grasp the characteristics of the imaging apparatus and the characteristics of the household display apparatus. Therefore, it is not possible for the user to easily grasp whether the brightness of a display image is correct. As a result, since it is not possible for the user to specify a proper display range, there is a likelihood that the visibility of a display image reduces.

In order to improve the visibility of a display image, image processing using the metadata of an HDMI 2.0a standard has been discussed. Since the metadata includes brightness information (information indicating correct brightness), it is possible for the user to grasp the brightness information with the metadata. However, even if the user is able to grasp brightness information, the user is not able to easily grasp whether the brightness of a display image is correct.

As art related to the HDR image data, there has been proposed a technology to subject the HDR image data to image processing based on a change in the HDR image data with time and display, the HDR image data having been subjected to the image processing (for example, Japanese Patent Application Laid-open No. 2015-170904). In the technology disclosed in Japanese Patent Application Laid-open No. 2015-170904, transmitted metadata includes information such as a frame position at which the HDR image data rapidly changes and a change amount of the HDR image data. Further, in a case when the HDR image data is subjected to the image processing using the above information, a display image is prevented from rapidly changing with time. As a result, the eyesight of the user may be protected from rapid changes in brightness and color between frames. However, even with the technology disclosed in Japanese Patent Application Laid-open No. 2015-170904, it is not possible for the user to easily grasp whether the brightness of a display image is correct.

SUMMARY OF THE INVENTION

The present invention provides a technology that allows a user to easily grasp whether the brightness of a display image is correct.

The present invention in its first aspect provides an information processing apparatus comprising a first acquisition unit configured to acquire input brightness information on brightness of input image data, a generation unit configured to generate display image data by converting gradation characteristics of the input image data based on display characteristics of a display unit, and a notification unit configured to perform, based on the display characteristics and the input brightness information, at least one of first notification processing to provide notification of information indicating that the display unit is able to display an image based on the display image data with brightness of the input image data, and second notification processing to provide notification of information indicating that the display unit is not able to display the image based on the display image data with the brightness of the input image data.

The present invention in its second aspect provides an information processing method comprising acquiring input brightness information on brightness of input image data, generating display image data by converting gradation characteristics of the input image data based on display characteristics of a display unit, and performing, based on the display characteristics and the input brightness information, at least one of first notification processing to provide notification of information indicating that the display unit is able to display an image based on the display image data with brightness of the input image data, and second notification processing to provide notification of information indicating that the display unit is not able to display the image based on the display image data with the brightness of the input image data.

The present invention in its third aspect provides a non-transitory computer readable medium that stores a program, wherein the program causes a computer to execute acquiring input brightness information on brightness of input image data, generating display image data by converting gradation characteristics of the input image data based on display characteristics of a display unit, and performing, based on the display characteristics and the input brightness information, at least one of first notification processing to provide notification of information indicating that the display unit is able to display an image based on the display image data with brightness of the input image data, and second notification processing to provide notification of information indicating that the display unit is not able to display the image based on the display image data with the brightness of the input image data.

According to the present invention, it is possible for a user to easily grasp whether the brightness of a display image is correct.

Further features of the present invention will become apparent from the following description of exemplary embodiments with reference to the attached drawings.

DESCRIPTION OF THE EMBODIMENTS

Hereafter, a description will be given, with reference to the drawings, of an embodiment of the present invention. Note that, an example in which an information processing apparatus according to the embodiment is provided in a display apparatus will be described, but the information processing apparatus may be separated from the display apparatus. In a case when the information processing apparatus is an apparatus separated from the display apparatus, a personal computer (PC), or the like, may be, for example, used as the information processing apparatus. As the display apparatus, a liquid-crystal display apparatus, for example, may be used. As the display apparatus, any other display apparatus having a light-emitting unit and a display panel that causes light from the light-emitting unit to pass through to display an image on a screen may be used. For example, a micro electro mechanical system (MEMS) shutter system display apparatus having an MEMS shutter, a projector, or the like, may be used as the display apparatus. As the display apparatus, a self-luminous type display apparatus, such as an organic EL display apparatus and a plasma display apparatus, may be used.

Figure 1:
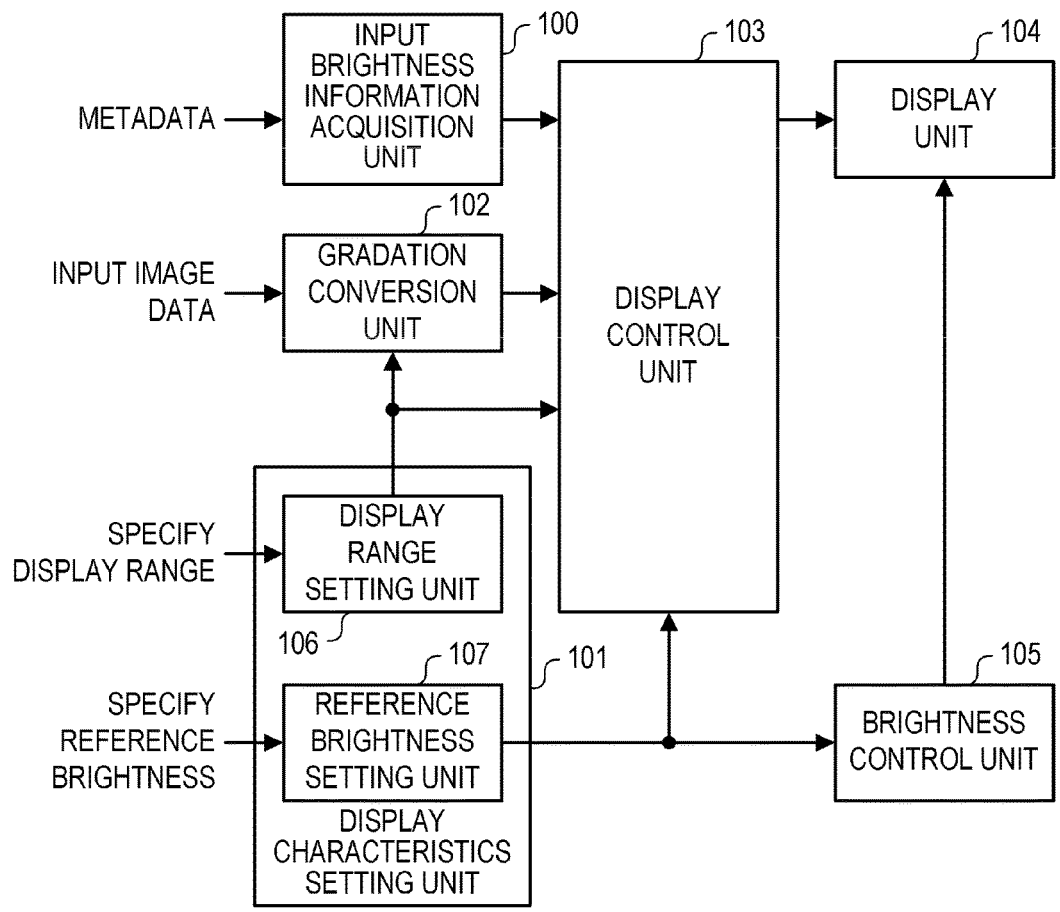
FIG. 1 is a block diagram showing a configuration example of a display apparatus according to an embodiment.

FIG. 1 is a block diagram showing a configuration example of the display apparatus according to the embodiment. As shown in FIG. 1, the display apparatus according to the embodiment has an input brightness information acquisition unit 100, a display characteristics setting unit 101, a gradation conversion unit 102, a display control unit 103, a display unit 104, and a brightness control unit 105. In a case when the information processing apparatus is an apparatus separated from the display apparatus, the information processing apparatus includes, for example, at least the input brightness information acquisition unit 100, the gradation conversion unit 102, and the display control unit 103.

The dynamic range, data format, or the like, of input image data, which is image data to be input to the display apparatus (information processing apparatus), is not particularly limited, but the embodiment will describe an example of a case in which the input image data is HDR image data. The HDR image data is image data having a wide dynamic range (brightness dynamic range). For example, the HDR image data is image data having a wider dynamic range than BT.709 used as the general standard of image data.

Figure 2:
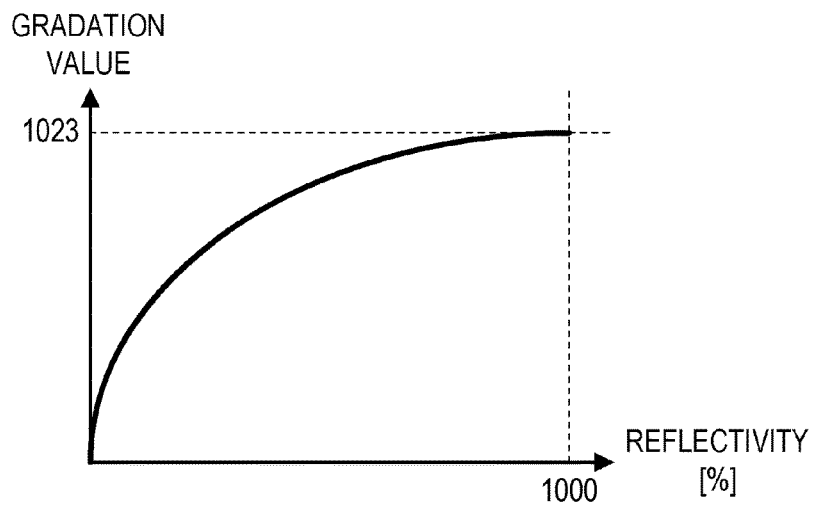
FIG. 2 is a diagram showing an example of the gradation characteristics of input image data according to the embodiment.

In a case when the input image data is captured image data, the brightness of the input image data corresponds to a reflectivity obtained in a case when light is reflected by an object. The correspondence between the gradation value of the input image data and the reflectivity is not particularly limited, but it is assumed in the embodiment that the input image data has logarithmic characteristics in which the gradation value logarithmically increases with an increase in the reflectivity as shown in FIG. 2. In many cases, the brightness of a light-receiving object irradiated with light is expressed by a reflectivity of about 0 to 100%, and the brightness (of a light-emitting object such as a light source and the sun) exceeding such brightness is expressed by a reflectivity of greater than or equal to 100%.

The reflectivity is a mode of brightness expression, but brightness expressed by the unit $cd/m^2$ (nit) is generally used in a grading operation. Therefore, in the embodiment, the brightness expressed by the unit $cd/m^2$ is used as the brightness of the input image data. The dynamic range of the input image data is not particularly limited, but it is assumed in the embodiment that the dynamic range of the input image data is from 0 to 1000 $cd/m^2$. Further, a bit number of the gradation value of the input image data is not particularly limited, but it is assumed in the embodiment that the gradation value of the input image data is a 10-bit value (0 to 1023).

The input brightness information acquisition unit 100 acquires input brightness information (first acquisition processing). The input brightness information is information on the brightness of input image data. In the embodiment, the metadata of the input image data includes the input brightness information, and the input brightness information acquisition unit 100 acquires the input brightness information from the metadata. In the embodiment, the input image data is moving-image data, and information indicating the maximum brightness (the maximum value of the brightness) of each frame and the maximum brightness (the maximum value of a plurality of maximum brightness corresponding to a plurality of frames, respectively) of the entire moving-image is acquired. The input brightness information acquisition unit 100 outputs the acquired input brightness information to the display control unit 103.

Note that the input brightness information is not limited to the above information. Information indicating representative brightness (such as average brightness, minimum brightness, most-frequently appearing brightness, and intermediate brightness) different from the maximum brightness may be used as the input brightness information. For example, information indicating the average brightness of each frame and the average brightness of the entire moving-image may be used as the input brightness information. Information indicating a plurality of types of representative brightness may be used as the input brightness information. For example, information indicating the average brightness and the maximum brightness of each frame and the average brightness and the maximum brightness of the entire moving-image may be used as the input brightness information. In the input brightness information, the representative brightness of a type different from the type of the representative brightness of the entire moving-image may be used as the representative brightness of each frame. For example, information indicating the maximum brightness of each frame and the average brightness of the entire moving-image may be used as the input brightness information. Information that does not indicate at least one of the representative brightness of each frame and the representative brightness of the entire moving-image may be used as the input brightness information. Information indicating the representative brightness of each scene may be used as the input brightness information. Since there is a case that the dynamic range of the input image data is determined according to the data format of the input image data, information indicating the data format of the input image data may be used as the input brightness information.

The method of acquiring the input brightness information is not limited to the above method. The input brightness information may be generated based on each pixel value of the input image data. For example, representative brightness may be calculated from each pixel value of the input image data to generate the input brightness information. The input image data may be static-image data.

In the embodiment, the display characteristics of the display unit 104 are changeable. The display characteristics setting unit 101 sets the display characteristics of the display unit 104. In the embodiment, the display characteristics setting unit 101 sets the display characteristics according to a user's operation. Here, the "user's operation" includes, for example, the "operation of specifying the display characteristics," the "operation of specifying an operation mode," the "operation of specifying the type of the input image data," or the like. The display characteristics setting unit 101 outputs characteristics information on current display characteristics to the gradation conversion unit 102, the display control unit 103, and the brightness control unit 105. The characteristics information includes, for example, "information indicating the display characteristics," "information indicating the operation mode," "information indicating the type of the input image data," or the like.

Note that the method of setting the display characteristics is not limited to the above method. The display characteristics may be automatically set according to the type of the input image data, the use environments of the display apparatus, or the like. In a case when the information processing apparatus is an apparatus separated from the display apparatus, the information processing apparatus may or may not have the display characteristics setting unit 101. The display apparatus may have the display characteristics setting unit 101, and the information processing apparatus may have an acquisition unit that acquires the characteristics information from the display apparatus (second acquisition processing). The display characteristics of the display unit 104 may be unchangeable prescribed characteristics. In this case, the display characteristics setting unit 101 becomes unnecessary. In addition, in this case, the information processing apparatus may have a storage unit that stores the characteristics information in advance, and the above acquisition unit of the information processing apparatus may acquire the characteristics information from an external apparatus (such as a server connected via a network) other than the display apparatus.

The display characteristics are not particularly limited, but include a display range and reference brightness in the embodiment. The display range is at least a part of the range of brightness possibly taken by the input image data. In other words, the display range is the "range of brightness used for display." The reference brightness is the reference of the brightness (the brightness of the screen; the display brightness) of the display unit 104. In the embodiment, the brightness of the display unit 104 is controlled such that an image is displayed with brightness based on the reference brightness. Specifically, the reference brightness is the upper limit of the brightness of the display unit 104, and the brightness of the display unit 104 is controlled such that an image, of which gradation values are an upper limit, is displayed with the reference brightness. Note that the reference brightness and the method of controlling the brightness of the display unit 104 are not particularly limited. For example, the brightness of the display unit 104 may be controlled such that the average brightness of the display unit 104 coincides with the reference brightness.

In the embodiment, the display characteristics setting unit 101 has a display range setting unit 106 and a reference brightness setting unit 107. The display range setting unit 106 sets the display range according to the user's operation and outputs display range information indicating a current display range to the gradation conversion unit 102 and the display control unit 103. The reference brightness setting unit 107 sets the reference brightness according to the user's operation and outputs reference brightness information indicating current reference brightness to the display control unit 103 and the brightness control unit 105.

The gradation conversion unit 102 acquires the characteristics information from the display characteristics setting unit 101 and determines the display characteristics associated with the acquired characteristics information as the current display characteristics of the display unit 104. Then, the gradation conversion unit 102 converts the gradation characteristics of the input image data based on the current display characteristics of the display unit 104 to generate display image data. In the embodiment, the gradation conversion unit 102 acquires display range information from the display range setting unit 106 and determines the display range indicated by the acquired display range information as the current display range of the display unit 104. After that, the gradation conversion unit 102 converts the gradation characteristics of the input image data based on the current display range of the display unit 104 to generate the display image data. The gradation conversion unit 102 outputs the display image data to the display control unit 103.

The method of converting the gradation characteristics of the input image data is not particularly limited. In the embodiment, the gradation conversion unit 102 converts the gradation characteristics of the input image data such that image data in which a gradation number inside the display range is greater than a gradation number outside the display range is generated as the display image data. Specifically, the gradation conversion unit 102 converts the gradation characteristics of the input image data such that the maximum brightness of the display range is associated with the maximum gradation value possibly taken by the display image data, and such that the minimum brightness of the display range is associated with the minimum gradation value possibly taken by the display image data.

Figure 3:
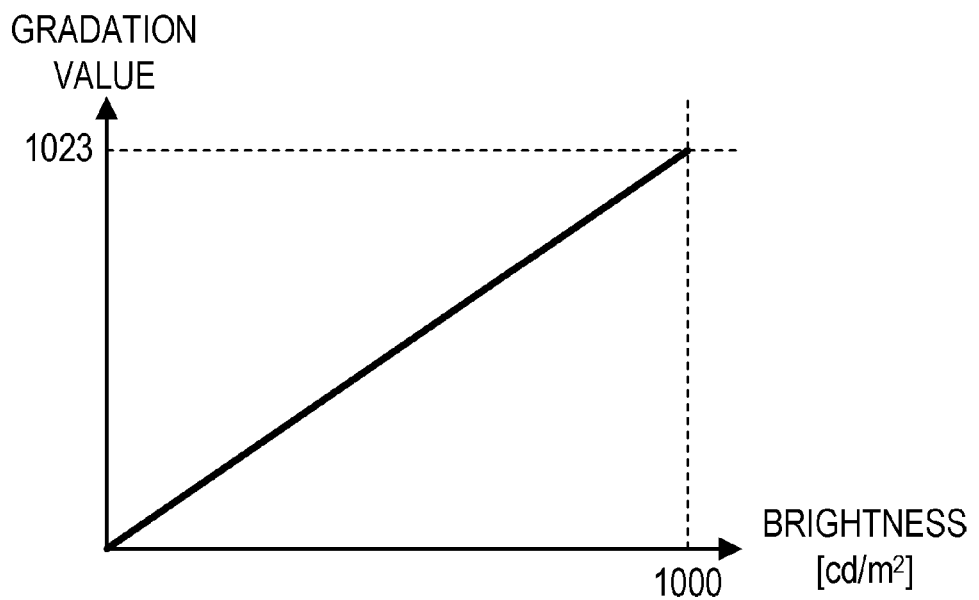
FIG. 3 is a diagram showing an example of the gradation characteristics of linear image data according to the embodiment.
Figure 4:
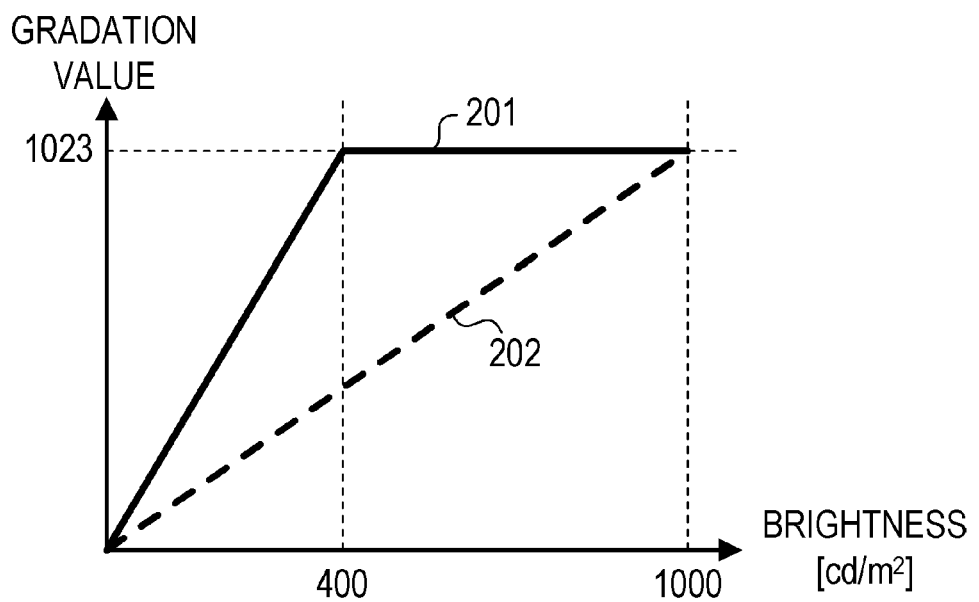
FIG. 4 is a diagram showing an example of the gradation characteristics of display image data according to the embodiment.

The processing of the gradation conversion unit 102 will be specifically described. First, as shown in FIG. 3, the gradation conversion unit 102 converts the gradation characteristics of the input image data into linear characteristics in which a gradation value linearly increases with an increase in brightness. Thus, linear image data having the linear characteristics as the gradation characteristics is generated. Then, as shown in FIG. 4, the gradation conversion unit 102 converts the gradation characteristics of the linear image data based on the display range. In FIG. 4, gradation characteristics 201 indicate gradation characteristics after the conversion in a case when the display range is from 0 to 400 cd/m$^2$, and gradation characteristics 202 indicate gradation characteristics after the conversion in a case when the display range is from 0 to 1000 cd/m$^2$.

According to the gradation characteristics 201, the maximum gradation value 1023 possibly taken by the display image data is associated with the maximum brightness 400 cd/m$^2$ of the display range, and the minimum gradation value zero possibly taken by the display image data is associated with the minimum brightness 0 cd/m$^2$ of the display range. Further, the brightness of the linear image data (input image data) higher than the maximum brightness 400 cd/m$^2$ is restricted to the maximum brightness 400 cd/m$^2$ (clipping). In other words, all gradation values of the linear image data corresponding to the brightness of greater than or equal to the maximum brightness 400 cd/m$^2$ are associated with the maximum value 1023.

Therefore, in a case when the reference brightness is 400 cd/m$^2$, the display unit 104 is able to properly display an image based on the display image data with the brightness of the input image data for the brightness 0 to 400 cd/m$^2$ of the input image data. However, for the brightness 400 cd/m$^2$ or higher of the input image data, the display unit 104 is not able to properly display an image based on the display image data with the brightness of the input image data by the above clipping.

Note that in a case when the minimum brightness of the display range is higher than the minimum brightness possibly taken by the input image data, the brightness of the linear image data lower than the minimum brightness of the display range is restricted to the minimum brightness of the display range. In this case, for the brightness of the input image data lower than the minimum brightness of the display range, the display unit 104 is not able to properly display an image based on the display image data with the brightness of the input image data.

According to the gradation characteristics 202, the same gradation characteristics as those of the linear image data are used as the gradation characteristics of the display image data. However, in a case when the reference brightness is 400 cd/m$^2$, the maximum brightness 1000 cd/m$^2$ possibly taken by the input image data is restricted to 400 cd/m$^2$, whereby an image entirely darker than the input image data is displayed.

Note that the gradation characteristics of the display image data are not limited to the gradation characteristics shown in FIG. 4. For example, inside of the display range, the gradation values may non-linearly increase with an increase in the brightness. In addition, outside of the display range, the gradation values may linearly or non-linearly increase with an increase in the brightness.

The display control unit 103 acquires the input brightness information from the input brightness information acquisition unit 100 and the display image data from the gradation conversion unit 102. The display control unit 103 acquires the characteristics information from the display characteristics setting unit 101, and determines display characteristics associated with the acquired characteristics information as the current display characteristics of the display unit 104. Then, the display control unit 103 performs at least one of first notification processing and second notification processing based on the input brightness information and the current display characteristics of the display unit 104. In the embodiment, the display control unit 103 acquires the display range information from the display range setting unit 106, and determines the display range indicated by the acquired display range information as the current display range of the display unit 104. The display control unit 103 acquires the reference brightness information from the reference brightness setting unit 107, and determines the reference brightness indicated by the acquired reference brightness information as the current reference brightness of the display unit 104. Then, the display control unit 103 performs at least one of the first notification processing and the second notification processing based on the current display range of the display unit 104, the current reference brightness of the display unit 104, and the input brightness information.

The first notification processing is processing to provide the notification of information indicating that the display unit 104 is able to display an image based on the display image data with the brightness of the input image data. Further, the second notification processing is processing to provide the notification of information indicating that the display unit 104 is not able to display the image based on the display image data with the brightness of the input image data. In the embodiment, information notified by the first notification processing and information notified by the second notification processing further indicate the brightness associated with the input brightness information.

In the embodiment, the first notification processing includes the following three processings:
 Processing to generate first graphic image data indicating that the display unit 104 is able to display the display image data with the brightness of the input image data based on the display characteristics and the input brightness information;
 Processing to combine the first graphic image data with the display image data; and
 Processing to output the display image data (first combined image data) having been combined with the first graphic image data to the display unit 104.

Further, in the embodiment, the second notification processing includes the following three processings:

Processing to generate second graphic image data indicating that the display unit 104 is not able to display the display image data with the brightness of the input image data based on the display characteristics and the input brightness information;

Processing to combine the second graphic image data with the display image data; and Processing to output the display image data (second combined image data) having been combined with the second graphic image data to the display unit 104.

In a case when the first combined image data is output to the display unit 104, the image based on the display image data and an image based on the first graphic image data are displayed on the display unit 104. Further, in a case when the second combined image data is output to the display unit 104, the image based on the display image data and an image based on the second graphic image data are displayed on the display unit 104.

In the embodiment, the display control unit 103 determines whether the display unit 104 is able to display an image based on the display image data with the brightness of the input image data based on the display characteristics (display range and reference brightness) and the input brightness information. Then, the display control unit 103 performs at least one of the first notification processing and the second notification processing based on a determination result of whether the display unit 104 is able to display the image based on the display image data with the brightness of the input image data. In the embodiment, the display control unit 103 performs the first notification processing in a case when the display unit 104 is able to display the image based on the display image data with the brightness of the input image data. Further, the display control unit 103 performs the second notification processing in a case when the display unit 104 is not able to display the image based on the display image data with the brightness of the input image data.

In the embodiment, as the first graphic image data and the second graphic image data, image data indicating the brightness associated with the input brightness information by a text is used. Therefore, by confirming display on the display unit 104, it is possible for a user to confirm an image based on the display image data or to easily grasp the brightness associated with the input brightness information. Further, in the embodiment, image data in a color different from the color of the second graphic image data is used as the first graphic image data. Therefore, based on the display color of the first graphic image data and the display color of the second graphic image data, it is possible for the user to easily grasp whether the display unit 104 is able to display an image based on the display image data with the brightness of the input image data. In other words, the "display color" is called the "color of the display unit 104," the "color of the screen," or the like.

Figure 5A:
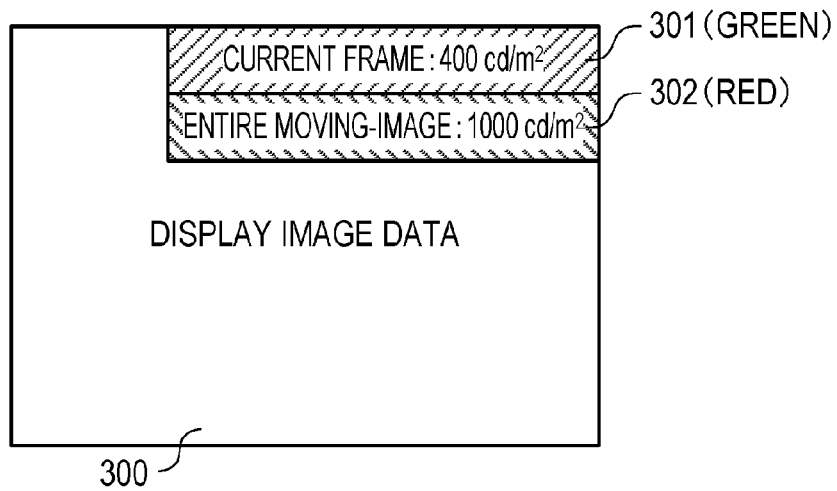
FIGS. 5A to 5C are diagrams showing an example of a display according to the embodiment.
Figure 5B:
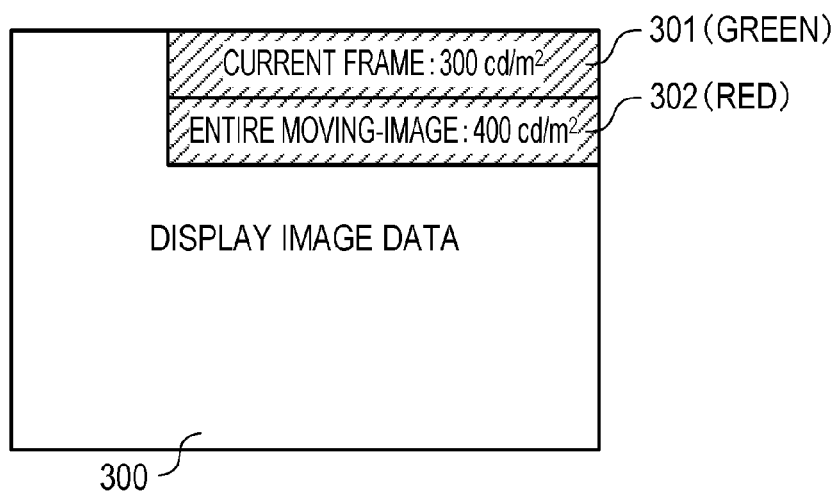
Figure 5C:
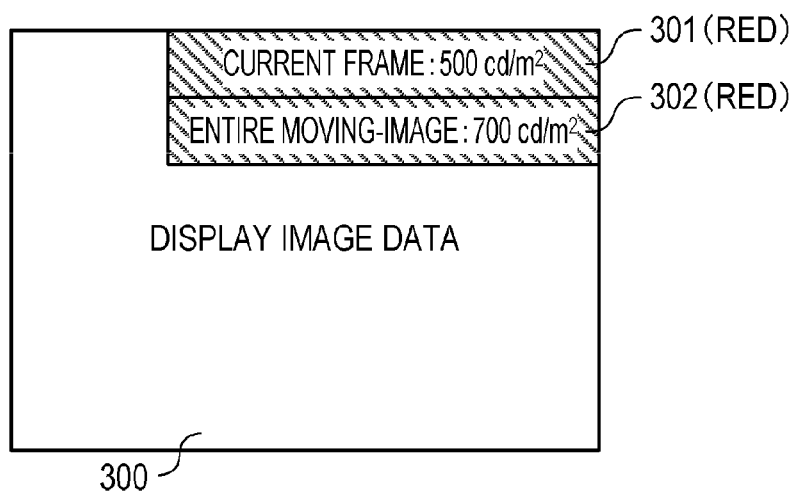

FIGS. 5A to 5C are diagrams showing a display example of the display unit 104. As shown in FIGS. 5A to 5C, in the embodiment, an image 300 based on the display image data and texts 301 and 302 indicating the brightness associated with the input brightness information are displayed. The text 301 indicates the maximum brightness of a currently-displayed frame (current frame), and the text 302 indicates the maximum brightness of an entire moving-image. In the embodiment, it is assumed that the minimum brightness of the display range is the fixed value 0 cd/m$^2$ and the brightness of 100 to 1000 cd/m$^2$ may be set as the maximum brightness of the display range. Further, the brightness of 48 to 400 cd/m$^2$ may be set as the reference brightness. Note that the minimum brightness of the display range may be changeable and the range of the maximum brightness of the display range may be narrower or wider than the above range. The range of the reference brightness may be narrower or wider than the above range.

FIG. 5A corresponds to the following conditions:
Maximum brightness of current frame: 400 cd/m$^2$;
Maximum brightness of entire moving-image: 1000 cd/m$^2$;
Maximum brightness of display range: 400 cd/m$^2$; and
Reference brightness: 400 cd/m$^2$.

In a case when the conditions "maximum brightness of display range: 400 cd/m$^2$" and "reference brightness: 400 cd/m$^2$" are set, the display unit 104 is able to properly display an image based on the display image data with the brightness of the input image data for the brightness 0 to 400 cd/m$^2$ of the input image data. Further, in FIG. 5A, the maximum brightness of the input image data corresponding to the current frame is 400 cd/m$^2$. Therefore, since the display unit 104 is able to properly display the current frame with the brightness of the input image data in FIG. 5A, the background of the text 301 indicating "maximum brightness of current frame: 400 cd/m$^2$" is displayed in green. By confirming the background of the text 301 displayed in green, it is possible for the user to easily grasp the fact that the display unit 104 is able to properly display the current frame with the brightness of the input image data.

On the other hand, in a case when the conditions "maximum brightness of display range: 400 cd/m$^2$" and "reference brightness: 400 cd/m$^2$" are set, the display unit 104 is not able to properly display the image based on the display image data with the brightness of the input image data for the brightness 400 cd/m$^2$ or higher of the input image data. Further, in FIG. 5A, the maximum brightness of the input image data corresponding to the entire moving-image is 1000 cd/m2 higher than the brightness 400 cd/m$^2$. Therefore, since there is a case that the display unit 104 is not able to properly display the image with the brightness of the input image data in FIG. 5A, the background of the text 302 indicating the condition "maximum brightness of entire moving-image: 1000 cd/m$^2$" is displayed in red. By confirming the background of the text 302 displayed in red, it is possible for the user to easily grasp the fact that the display unit 104 is not able to properly display the image with the brightness of the input image data in some cases.

FIG. 5B corresponds to the following conditions:
Maximum brightness of current frame: 300 cd/m$^2$;
Maximum brightness of entire moving-image: 400 cd/m$^2$;
Maximum brightness of display range: 400 cd/m$^2$; and
Reference brightness: 400 cd/m$^2$.

In FIG. 5B, the maximum brightness of the input image data corresponding to the current frame is 300 cd/m$^2$ lower than the brightness 400 cd/m$^2$. Therefore, since the display unit 104 is able to properly display the current frame with the brightness of the input image data in FIG. 5B, the background of the text 301 indicating "maximum brightness of current frame: 300 cd/m$^2$" is displayed in green. Further, in FIG. 5B, the maximum brightness of the input image data corresponding to the entire moving-image is 400 cd/m$^2$. Therefore, since the display unit 104 is able to properly display the image with the brightness of the input image data at all times in FIG. 5B, the background of the text 302 indicating "maximum brightness of entire moving-image: 400 cd/m$^2$" is also displayed in green.

By confirming the background of the text 302 displayed in green, it is possible for the user to easily grasp the fact that the display unit 104 is able to display the image with the brightness of the input image data at all times.

FIG. 5C corresponds to the following conditions:
Maximum brightness of current frame: 500 cd/m$^2$;
Maximum brightness of entire moving-image: 700 cd/m$^2$;
Maximum brightness of display range: 400 cd/m$^2$; and
Reference brightness: 400 cd/m$^2$.

In FIG. 5C, the maximum brightness of the input image data corresponding to the current frame is 500 cd/m$^2$ higher than the brightness 400 cd/m$^2$. Therefore, since the display unit 104 is not able to properly display the current frame with the brightness of the input image data in FIG. 5C, the background of the text 301 indicating "maximum brightness of current frame: 500 cd/m$^2$" is displayed in red. By confirming the background of the text 301 displayed in red, it is possible for the user to easily grasp the fact that the display unit 104 is not able to properly display the current frame with the brightness of the input image data. Further, in FIG. 5C, the maximum brightness of the input image data corresponding to the entire moving-image is 700 cd/m$^2$ higher than the brightness 400 cd/m$^2$. Therefore, since there is a case that the display unit 104 is not able to properly display the image with the brightness of the input image data in FIG. 5C, the background of the text 302 indicating the condition "maximum brightness of entire moving-image: 700 cd/m$^2$" is also displayed in red.

The display unit 104 displays the images (images as shown in FIGS. 5A to 5C) based on the image data output from the display control unit 103. The brightness control unit 105 acquires the reference brightness information from the reference brightness setting unit 107, and determines the reference brightness indicated by the acquired reference brightness information as the current reference brightness of the display unit 104. Then, the brightness control unit 105 controls the brightness of the display unit 104 based on the current reference brightness of the display unit 104. As described above, in the embodiment, the reference brightness is the upper limit of the brightness of the display unit 104, and the brightness of the display unit 104 is controlled such that an image, of which gradation values are an upper limit, is displayed with the reference brightness.

Figure 6:
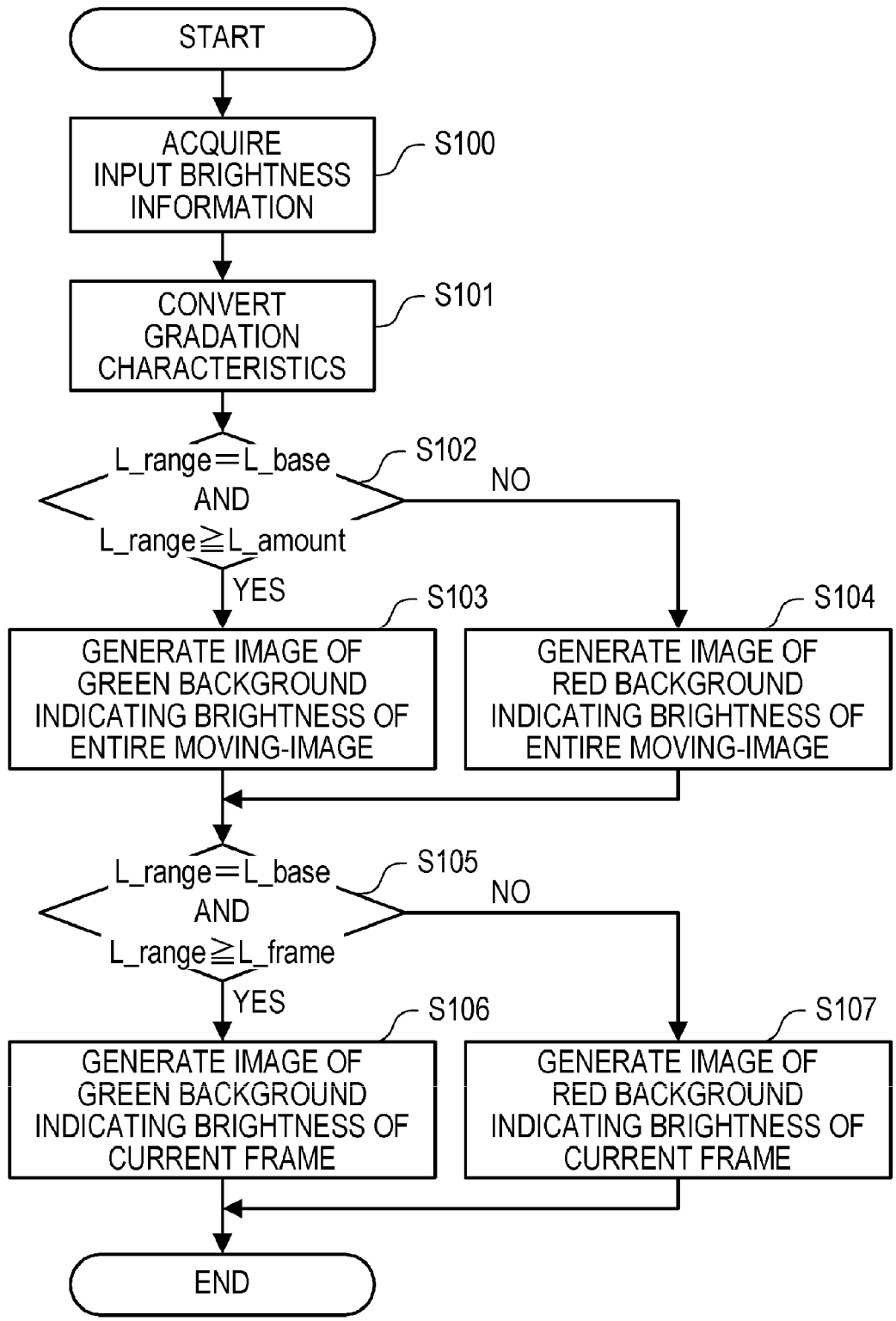
FIG. 6 is a flowchart showing an example of the processing flow of the image display apparatus according to the embodiment.

Hereafter, a description will be given, with reference to FIG. 6, of the processing flow of the image display apparatus according to the embodiment. FIG. 6 is a flowchart showing an example of the processing flow of the image display apparatus according to the embodiment. The flowchart of FIG. 6 is performed for, for example, each frame of the input image data. Here, the processing flow corresponding to the following conditions will be described:
Maximum brightness of current frame: 400 cd/m$^2$;
Maximum brightness of entire moving-image: 1000 cd/m$^2$;
Maximum brightness of display range: 400 cd/m$^2$; and
Reference brightness: 400 cd/m$^2$.

First, in step S100, the input brightness information acquisition unit 100 acquires the input brightness information indicating the maximum brightness of the input image data corresponding to a current frame and the maximum brightness of the input image data corresponding to an entire moving-image from the metadata of the input image data. Here, the input brightness information indicating the conditions "maximum brightness of current frame: 400 cd/m$^2$" and "maximum brightness of entire moving-image: 1000 cd/m$^2$" is acquired. Then, the input brightness information acquisition unit 100 outputs the acquired input brightness information to the display control unit 103.

Next, in step S101, the gradation conversion unit 102 converts the gradation characteristics of the input image data based on a current display range to generate the display image data. Here, since the display range is from 0 to 400 cd/m$^2$, the display image data having the gradation characteristics 201 shown in FIG. 4 is generated. After that, the gradation conversion unit 102 outputs the generated display image data to the display control unit 103.

Then, in step S102, the display control unit 103 makes a determination based on the current display range, current reference brightness, and the maximum brightness of the input image data corresponding to the entire moving-image. In step S102, a determination is made as to whether the maximum brightness (L_range) of the current display range is equal to the current reference brightness (L_base) and higher than or equal to the maximum brightness (L_amount) of the input image data corresponding to the entire moving-image. In a case when the maximum brightness of the current display range is equal to the current reference brightness and greater than or equal to the maximum brightness of the input image data corresponding to the entire moving-image, the display unit 104 is able to properly display an image with the brightness of the input image data at all times. Therefore, the processing proceeds to step S103. In a case when the correspondence between the maximum brightness of the current display range, the current reference brightness, and the maximum brightness of the input image data corresponding to the entire moving-image is different from the above correspondence, there is a case that the display unit 104 is not able to properly display the image with the brightness of the input image data. Therefore, the processing proceeds to step S104.

In step S103, the display control unit 103 generates the graphic image data (first graphic image data) in which the maximum brightness of the input image data corresponding to the entire moving-image is indicated by a text and the color of a background is green. Then, the display control unit 103 combines the generated graphic image data with the display image data. After that, the processing proceeds to step S105.

In step S104, the display control unit 103 generates the graphic image data (second graphic image data) in which the maximum brightness of the input image data corresponding to the entire moving-image is indicated by a text and the color of a background is red. Then, the display control unit 103 combines the generated graphic image data with the display image data. After that, the processing proceeds to step S105.

Here, the maximum brightness 400 cd/m$^2$ of the display range is equal to the reference brightness 400 cd/m$^2$, but lower than the maximum brightness 1000 cd/m$^2$ of the input image data corresponding to the entire moving-image. Therefore, the processing proceeds from step S102 to step S104. Then, the graphic image data, in which the maximum brightness 1000 cd/m$^2$ of the input image data corresponding to the entire moving-image is indicated by a text and the color of the background is red, is generated and combined.

Note that in a case when both the maximum brightness of the display range and the reference brightness are equal to the maximum brightness 1000 cd/m$^2$ of the input image data corresponding to the entire moving-image, the processing proceeds from step S102 to step S103. Then, the graphic image data, in which the maximum brightness 1000 cd/m$^2$ of the input image data corresponding to the entire moving-image is indicated by a text and the color of the background is green, is generated and combined.

In step S105, the display control unit 103 makes a determination based on the current display range, the current reference brightness, and the maximum brightness of the input image data corresponding to the current frame. In step S105, a determination is made as to whether the maximum brightness (L_range) of the current display range is equal to the current reference brightness (L_base) and greater than or equal to the maximum brightness (L_frame) of the input image data corresponding to the current frame. In a case when the maximum brightness of the current display range is equal to the current reference brightness and greater than or equal to the maximum brightness of the input image data corresponding to the current frame, the display unit 104 is able to properly display the current frame with the brightness of the input image data. Therefore, the processing proceeds to step S106. In a case when the correspondence between the maximum brightness of the current display range, the current reference brightness, and the maximum brightness of the input image data corresponding to the current frame is different from the above correspondence, the display unit 104 is not able to properly display the current frame with the brightness of the input image data. Therefore, the processing proceeds to step S107.

In step S106, the display control unit 103 generates the graphic image data (first graphic image data) in which the maximum brightness of the input image data corresponding to the current frame is indicated by a text and the color of a background is green. Then, the display control unit 103 combines the generated graphic image data with the display image data (image data having been subjected to the processing of step S103 or step S104). After that, the image data having been subjected to the processing of step S103 or step S104 and the processing of step S106 is output to the display unit 104, and an image based on the image data is displayed. Then, the processing flow corresponding to the current frame is ended.

In step S107, the display control unit 103 generates the graphic image data (second graphic image data) in which the maximum brightness of the input image data corresponding to the current frame is indicated by a text and the color of a background is red. Then, the display control unit 103 combines the generated graphic image data with the display image data (image data having been subjected to the processing of step S103 or step S104). After that, the image data having been subjected to the processing of step S103 or step S104 and the processing of step S107 is output to the display unit 104, and an image based on the image data is displayed. Then, the processing flow corresponding to the current frame is ended.

Here, the maximum brightness 400 cd/m$^2$ of the display range is equal to the reference brightness 400 cd/m$^2$ and the maximum brightness 400 cd/m$^2$ of the input image data corresponding to the current frame. Therefore, the processing proceeds from steps S105 to S106. Then, the graphic image data in which the maximum brightness 400 cd/m$^2$ of the input image data corresponding to the current frame is indicated by a text and the color of a background is green is generated and combined. As a result, an image as shown in FIG. 5A is displayed.

Note that in a case when the reference brightness is changed from 400 cd/m$^2$ to 100 cd/m$^2$, the display unit 104 is not able to properly display the current frame with the brightness of the input image data. For example, the brightness 400 cd/m$^2$ of the input image data is displayed with brightness lower than the brightness 400 cd/m$^2$. Therefore, in such a case, the processing proceeds from step S105 to step S107. Then, the graphic image data, in which the maximum brightness 400 cd/m$^2$ of the input image data corresponding to the current frame is indicated by a text and the color of a background is red, is generated and combined. In addition, in a case when the reference brightness is not changed from 400 cd/m$^2$ and the maximum brightness of the display range is changed from 400 cd/m$^2$ to 1000 cd/m$^2$, the display unit 104 is not able to properly display the current frame with the brightness of the input image data. Therefore, in such a case, the processing also proceeds from step S105 to step S107. Then, the graphic image data, in which the maximum brightness 400 cd/m$^2$ of the input image data corresponding to the current frame is indicated by a text and the color of a background is red, is generated and combined.

Note that in a case when the processing of step S103 is performed, the display unit 104 is able to properly display the current frame with the brightness of the input image data. Therefore, in a case when the processing of step S103 is performed, the processing of step S106 may be omitted, and the processing may proceed from step S103 to step S106. The processing of steps S102 to S104 and the processing of steps S105 to S107 may be performed in parallel. After the processing of steps S105 to S107, the processing of steps S102 to S104 may be performed.

As described above, according to the embodiment, at least one of the first notification processing and the second notification processing is performed based on the display characteristics and the input brightness information. Thus, it is possible for the user to easily grasp whether the brightness of the display image is correct. As a result, it is possible for the user to be urged to perform the user's operation of changing the display characteristics to improve the visibility of the display image and to improve the visibility of the display image.

Note that the first notification processing and the second notification processing are not limited to the above processing. For example, instead of using the color of a background, the color of a text, the type of an icon, the shape of an image, the pattern of an image, the blinking pattern of an image, the type of a symbol, a text, or the like, may be used to express whether the display unit 104 is able to display an image based on the display image data with the brightness of the input image data. In addition, colors different from green and red may be used as colors indicating whether the display unit 104 is able to display an image based on the display image data with the brightness of the input image data. In the first notification processing and the second notification processing, the brightness associated with the input brightness information may not be notified. In the first notification processing and the second notification processing, information may be notified by the output of a sound, the lighting of a lamp (light-emitting unit different from the display unit), or the like, rather than being notified by image display.

Figures 7, 8:
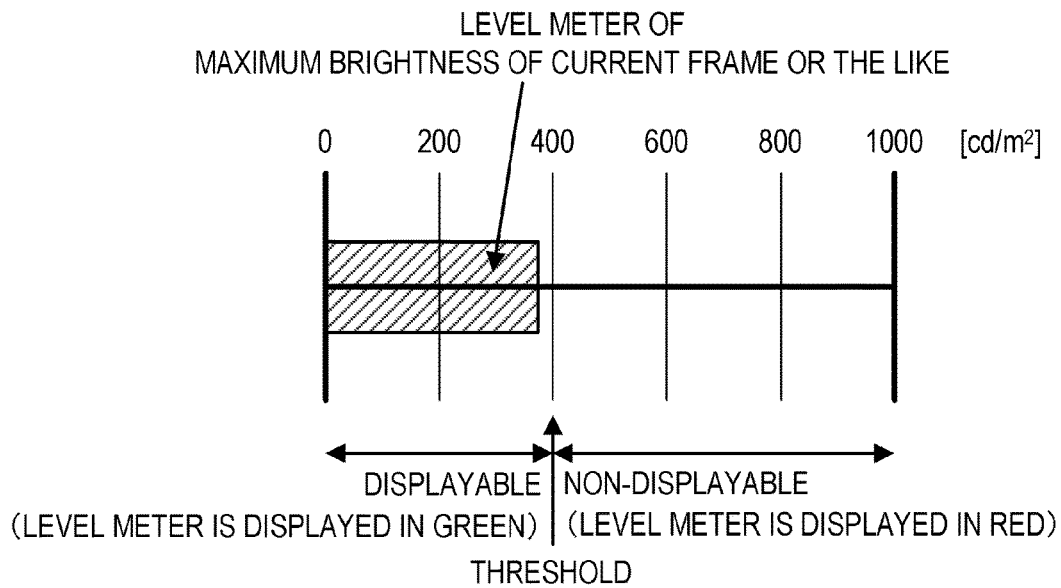
FIG. 7 is a diagram showing an example of graphic image data according to the embodiment.
FIG. 8 is a diagram showing an example of the graphic image data according to the embodiment.

As shown in FIG. 7, image data indicating the brightness associated with the input brightness information by a level meter may be used as the first graphic image data and the second graphic image data. Even when such image data is used, it is possible for the user to easily grasp the brightness associated with the input brightness information by confirming display on the display unit.

In FIG. 7, a threshold for the brightness is a threshold as to whether the display unit is able to display an image based on the display image data with the brightness of the input image data. The threshold may be determined based on the display characteristics. For example, in a case when the display range is from 0 to 400 cd/m$^2$ and the reference brightness is 400 cd/m², 400 cd/m² may be determined to be the threshold. Further, based on whether the brightness associated with the input brightness information is less than or equal to the threshold, the color, pattern, blinking pattern, or the like, of the level meter indicating the brightness associated with the input brightness information may be changed. For example, a green level meter may be displayed in a case when the brightness associated with the input brightness information is less than or equal to the threshold, and a red level meter may be displayed in a case when the brightness associated with the input brightness information is higher than the threshold. Thus, it is possible for the user to easily grasp whether the display unit is able to display an image based on the display image data with the brightness of the input image data.

As shown in FIG. 8, image data indicating the table of the correspondence between the display characteristics possibly taken by the display unit, brightness possibly taken by the input image data, and displayable information may be used as the first graphic image data and the second graphic image data. The displayable information is information indicating whether the display unit is able to display an image based on the display image data with the brightness of the input image data. With the use of such image data, it is possible for the user to easily grasp combinations in which an image is displayed with correct brightness, and combinations in which the image is not displayed with the correct brightness as the combinations of the display characteristics and the brightness of the input image data. In FIG. 8, colors indicating whether the display unit is able to display an image based on the display image data with the brightness of the input image data are used as the displayable information. The displayable information may be an icon, a text, a symbol, or the like. FIG. 8 shows some of the combinations, but all of the combinations may be shown in the table, or the combinations shown in the table may be changeable.

Note that the above embodiment describes an example in which both of the first notification processing and the second notification processing are performed, but only one of the first notification processing and the second notification processing may be performed. For example, notification processing (first notification processing) may be performed in a case when the display unit is able to display an image based on the display image data with the brightness of the input image data, and may not be performed in a case when the display unit is not able to display the image based on the display image data with the brightness of the input image data. The notification processing (second notification processing) may not be performed in a case when the display unit is able to display the image based on the display image data with the brightness of the input image data, and may be performed in a case when the display unit is not able to display the image based on the display image data with the brightness of the input image data. Thus, depending on whether the notification processing has been performed, it is possible for the user to easily grasp whether the display unit is able to display the image based on the display image data with the brightness of the input image data.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
    an acquisition unit configured to acquire input brightness information on brightness of input image data, wherein the input image data includes gradation characteristics;
    a setting unit configured to set, based on a user's operation, (i) a display range that is a range for displaying brightness that includes at least a portion of a range of possible brightness of the input image data, and (ii) reference brightness that is an upper limit of brightness of a display unit;
    a generation unit configured to generate display image data by converting the gradation characteristics of the input image data, based on the display range set by the setting unit;
    a determining unit configured to determine display characteristics of the display unit based on (i) the input brightness information acquired by the acquisition unit, (ii) the display range set by the setting unit, and (iii) the reference brightness set by the setting unit; and
    a notification unit configured (i) to perform first notification processing to provide a first notification of information to a user regarding the display unit, in a case when the determining unit determines that the display unit is able to display an image based on the display image data generated by the generation unit with the brightness of the input image data, and (ii) to perform second notification processing to provide a second notification of information to a user regarding the display unit, in a case when the determining unit determines that the display unit is not able to display the image based on the display image data generated by the generation unit with the brightness of the input image data.

2. The information processing apparatus according to claim 1, wherein the notification unit performs the second notification processing in a case when a maximum brightness of the display range is higher than the reference brightness.

3. The information processing apparatus according to claim 1, wherein each of the first notification processing and the second notification processing includes processing to notify the brightness associated with the input brightness information.

4. The information processing apparatus according to claim 1, wherein the first notification processing includes processing:
(i) to generate first graphic image data indicating that the display unit is able to display the display image data with the brightness of the input image data;
(ii) to combine the first graphic image data with the display image data; and
(iii) to output the display image data combined with the first graphic image data to the display unit, and
the second notification processing includes processing:
(i) to generate second graphic image data indicating that the display unit is not able to display the display image data with the brightness of the input image data;
(ii) to combine the second graphic image data with the display image data; and
(iii) to output the display image data combined with the second graphic image data to the display unit.

5. The information processing apparatus according to claim 4, wherein a color of the first graphic image data is different from a color of the second graphic image data.

6. The information processing apparatus according to claim 4, wherein each of the first graphic image data and the second graphic image data is image data indicating the brightness associated with the input brightness information by one of a text and a level meter.

7. The information processing apparatus according to claim 4, wherein each of the first graphic image data and the second graphic image data is image data indicating among a maximum brightness that the display unit is able to display the image based on the display image data with the brightness of the input image data, brightness possibly taken by the input image data, and information indicating whether the display unit is able to display the image based on the display image data with the brightness of the input image data.

8. The information processing apparatus according to claim 1, wherein the input brightness information includes at least one of maximum brightness of the input image data and average brightness of the input image data.

9. The information processing apparatus according to claim 1, wherein the input brightness information includes a maximum brightness of the input image data, and the notification unit performs the first notification processing in a case when a maximum brightness of the display range is equal to the reference brightness and the maximum brightness of the input image data is not higher than the maximum brightness of the display range, and performs the second notification processing in a case when the maximum brightness of the display range is equal to the reference brightness and the maximum brightness of the input image data is higher than the maximum brightness of the display range.

10. The information processing apparatus according to claim 1, wherein the input image data is moving-image data, the input brightness information includes a maximum brightness of entire moving-image data, and the notification unit performs the first notification processing in a case when a maximum brightness of the display range is equal to the reference brightness and the maximum brightness of the entire moving-image data is not higher than the maximum brightness of the display range, and performs the second notification processing in a case when the maximum brightness of the display range is equal to the reference brightness and the maximum brightness of the entire moving-image data is higher than the maximum brightness of the display range.

11. The information processing apparatus according to claim 1, wherein the input image data is moving-image data, the input brightness includes a maximum brightness of a displayed frame of the moving-image data, and the notification unit performs the first notification processing in a case when a maximum brightness of the display range is equal to the reference brightness and the maximum brightness of the displayed frame is not higher than the maximum brightness of the display range, and performs the second notification processing in a case when the maximum brightness of the display range is equal to the reference brightness and the maximum brightness of the displayed flame is higher than the maximum brightness of the display range.

12. The information processing apparatus according to claim 1, wherein the generation unit generates image data, in which a gradation number inside of the display range is greater than a gradation number outside of the display range, as the display image data.

13. The information processing apparatus according to claim 1, wherein the generation unit converts the gradation characteristics of the input image data such that maximum brightness of the display range is associated with a maximum gradation value possibly taken by the display image data and a minimum brightness of the display range is associated with a minimum gradation value possibly taken by the display image data.

14. The information processing apparatus according to claim 1, wherein the generation unit generates image data, in which gradation values outside of the display range have been clipped to a maximum gradation value of the display range, as the display image data.

15. The information processing apparatus according to claim 1, wherein the input image data is High Dynamic Range (HDR) image data.

16. The information processing apparatus according to claim 1, wherein the input brightness information is included in metadata of the input image data, and the acquisition unit acquires the input brightness information from the metadata.

17. The information processing apparatus according to claim 1, wherein the acquisition unit generates the input brightness information based on each pixel value of the input image data.

18. An information processing method comprising:
acquiring input brightness information on brightness of input image data, wherein the input data includes gradation characteristics;
setting, based on a user's operation, (i) a display range that is a range for displaying brightness that includes at least a portion of a range of possible brightness of the input image data, and (ii) reference brightness that is an upper limit of brightness of a display unit;
generating display image data by converting the gradation characteristics of the input image data, based on the display range set by the setting unit;
determining display characteristics of the display unit based on (i) the input brightness information acquired by the acquisition unit, (ii) the display range set by the setting unit, and (iii) the reference brightness set by the setting unit; and performing first notification processing to provide a first notification of information to a user regarding the display unit, in a case when the determining determines that the display unit is able to display an image based on the display image data generated in the generating with the brightness of the input image data, and (ii) performing second notification processing to provide a second notification of information to a user regarding the display unit, in a case when the determining determines that the display unit is not able to display the image based on the display image data generated in the generating with the brightness of the input image data.

19. A non-transitory computer readable storage medium that stores a program, wherein the program causes a computer to execute:
acquiring input brightness information on brightness of input image data, wherein the input image data includes gradation characteristics;
setting, based on a user's operation, (i) a display range that is a range for displaying brightness that includes at least a portion of a range of possible brightness of the input image data, and (ii) reference brightness that is an upper limit of brightness of a display unit;
generating display image data by converting the gradation characteristics of the input image data, based on the display range set by the setting unit;
determining display characteristics of the display unit based on (i) the input brightness information acquired by the acquisition unit, (ii) the display range set by the setting unit, and (iii) the reference brightness set by the setting unit; and
performing first notification processing to provide a first notification of information to a user regarding the display unit, in a case when the determining determines that the display unit is able to display an image based on the display image data generated in the generating with the brightness of the input image data, and (ii) performing second notification processing to provide a second notification of information to a user regarding the display unit, in a case when the determining determines that the display unit is not able to display the image based on the display image data generated in the generating with the brightness of the input image data.

20. The information processing method according to claim 18, wherein the second notification processing is performed in a case when a maximum brightness of the display range is higher than the reference brightness.

21. The information processing method according to claim 18, wherein each of the first notification processing and the second notification processing includes processing to notify the brightness associated with the input brightness information.

22. The information processing method according to claim 18, wherein the first notification processing includes processing:
(i) to generate first graphic image data indicating that the display unit is able to display the display image data with the brightness of the input image data;
(ii) to combine the first graphic image data with the display image data; and
(iii) to output the display image data combined with the first graphic image data to the display unit, and
the second notification processing includes processing:
(i) to generate second graphic image data indicating that the display unit is not able to display the display image data with the brightness of the input image data;
(ii) to combine the second graphic image data with the display image data; and
(iii) to output the display image data combined with the second graphic image data to the display unit.

23. The information processing method according to claim 22, wherein a color of the first graphic image data is different from a color of the second graphic image data.

24. The information processing method according to claim 22, wherein each of the first graphic image data and the second graphic image data is image data indicating the brightness associated with the input brightness information by one of a text and a level meter.

25. The information processing method according to claim 22, wherein each of the first graphic image data and the second graphic image data is image data indicating among a maximum brightness that the display unit is able to display the image based on the display image data with the brightness of the input image data, brightness possibly taken by the input image data, and information indicating whether the display unit is able to display the image based on the display image data with the brightness of the input image data.

26. The information processing method according to claim 18, wherein the input brightness information includes at least one of maximum brightness of the input image data and average brightness of the input image data.

27. The information processing method according to claim 18, wherein the input brightness information includes a maximum brightness of the input image data, and the first notification processing is performed in a case when a maximum brightness of the display range is equal to the reference brightness and the maximum brightness of the input image data is not higher than the maximum brightness of the display range, and the second notification processing is performed in a case when the maximum brightness of the display range is equal to the reference brightness and the maximum brightness of the input image data is higher than the maximum brightness of the display range.

28. The information processing method according to claim 18, wherein the input image data is moving-image data, the input brightness information includes a maximum brightness of entire moving-image data, and the first notification processing is performed in a case when a maximum brightness of the display range is equal to the reference brightness and the maximum brightness of the entire moving-image data is not higher than the maximum brightness of the display range, and the second notification processing is performed in a case when the maximum brightness of the display range is equal to the reference brightness and the maximum brightness of the entire moving-image data is higher than the maximum brightness of the display range.

29. The information processing method according to claim 18, wherein the input image data is moving-image data, the input brightness includes a maximum brightness of a displayed frame of the moving-image data, and the first notification processing is performed in a case when a maximum brightness of the display range is equal to the reference brightness and the maximum brightness of the displayed frame is not higher than the maximum brightness of the display range, and the second notification processing is performed in a case when the maximum brightness of the display range is equal to the reference brightness and the maximum brightness of the displayed flame is higher than the maximum brightness of the display range.

30. The information processing method according to claim 29, wherein the generating generates image data, in which a gradation number inside of the display range is greater than a gradation number outside of the display range, as the display image data.

31. The information processing method according to claim 29, wherein the generating converts the gradation characteristics of the input image data such that maximum brightness of the display range is associated with a maximum gradation value possibly taken by the display image data and a minimum brightness of the display range is associated with a minimum gradation value possibly taken by the display image data.

32. The information processing method according to claim 29, wherein the generating generates image data, in which gradation values outside of the display range have been clipped to a maximum gradation value of the display range, as the display image data.

33. The information processing method according to claim 29, wherein the input image data is High Dynamic Range (HDR) image data.

34. The information processing method according to claim 18, wherein the input brightness information is included in metadata of the input image data, and the acquiring acquires the input brightness information from the metadata.

35. The information processing method according to claim 18, wherein the acquiring generates the input brightness information based on each pixel value of the input image data.

36. The non-transitory computer readable storage medium according to claim 19, wherein the second notification processing is performed in a case when a maximum brightness of the display range is higher than the reference brightness.

37. The non-transitory computer readable storage medium according to claim 19, wherein each of the first notification processing and the second notification processing includes processing to notify the brightness associated with the input brightness information.

38. The non-transitory computer readable storage medium according to claim 19, wherein the first notification processing includes processing:
   (i) to generate first graphic image data indicating that the display unit is able to display the display image data with the brightness of the input image data;
   (ii) to combine the first graphic image data with the display image data; and
   (iii) to output the display image data combined with the first graphic image data to the display unit, and
   the second notification processing includes processing:
   (i) to generate second graphic image data indicating that the display unit is not able to display the display image data with the brightness of the input image data;
   (ii) to combine the second graphic image data with the display image data; and
   (iii) to output the display image data combined with the second graphic image data to the display unit.

39. The non-transitory computer readable storage medium according to claim 38, wherein a color of the first graphic image data is different from a color of the second graphic image data.

40. The non-transitory computer readable storage medium according to claim 38, wherein each of the first graphic image data and the second graphic image data is image data indicating the brightness associated with the input brightness information by one of a text and a level meter.

41. The non-transitory computer readable storage medium according to claim 38, wherein each of the first graphic image data and the second graphic image data is image data indicating among a maximum brightness that the display unit is able to display the image based on the display image data with the brightness of the input image data, brightness possibly taken by the input image data, and information indicating whether the display unit is able to display the image based on the display image data with the brightness of the input image data.

42. The non-transitory computer readable storage medium according to claim 19, wherein the input brightness information includes at least one of maximum brightness of the input image data and average brightness of the input image data.

43. The non-transitory computer readable storage medium according to claim 19, wherein the input brightness information includes a maximum brightness of the input image data, and the first notification processing is performed in a case when a maximum brightness of the display range is equal to the reference brightness and the maximum brightness of the input image data is not higher than the maximum brightness of the display range, and the second notification processing is performed in a case when the maximum brightness of the display range is equal to the reference brightness and the maximum brightness of the input image data is higher than the maximum brightness of the display range.

44. The non-transitory computer readable storage medium according to claim 19, wherein the input image data is moving-image data, the input brightness information includes a maximum brightness of entire moving-image data, and the first notification processing is performed in a case when a maximum brightness of the display range is equal to the reference brightness and the maximum brightness of the entire moving-image data is not higher than the maximum brightness of the display range, and the second notification processing is performed in a case when the maximum brightness of the display range is equal to the reference brightness and the maximum brightness of the entire moving-image data is higher than the maximum brightness of the display range.

45. The non-transitory computer readable storage medium according to claim 19, wherein the input image data is moving-image data, the input brightness includes a maximum brightness of a displayed frame of the moving-image data, and the first notification processing is performed in a case when a maximum brightness of the display range is equal to the reference brightness and the maximum brightness of the displayed frame is not higher than the maximum brightness of the display range, and the second notification processing is performed in a case when the maximum brightness of the display range is equal to the reference brightness and the maximum brightness of the displayed flame is higher than the maximum brightness of the display range.

46. The non-transitory computer readable storage medium according to claim 45, wherein the generating generates image data, in which a gradation number inside of the display range is greater than a gradation number outside of the display range, as the display image data.

47. The non-transitory computer readable storage medium according to claim 45, wherein the generating converts the gradation characteristics of the input image data such that maximum brightness of the display range is associated with a maximum gradation value possibly taken by the display image data and a minimum brightness of the display range is associated with a minimum gradation value possibly taken by the display image data.

48. The non-transitory computer readable storage medium according to claim 45, wherein the generating generates image data, in which gradation values outside of the display range have been clipped to a maximum gradation value of the display range, as the display image data.

49. The non-transitory computer readable storage medium according to claim 45, wherein the input image data is High Dynamic Range (HDR) image data.

50. The non-transitory computer readable storage medium according to claim 19, wherein the input brightness information is included in metadata of the input image data, and the acquiring acquires the input brightness information from the metadata.

51. The non-transitory computer readable storage medium according to claim 19, wherein the acquiring generates the input brightness information based on each pixel value of the input image data.

* * * * *